United States Patent [19]
Maeda et al.

[11] Patent Number: 4,946,194
[45] Date of Patent: Aug. 7, 1990

[54] STEERING WHEEL CONSTRUCTION OF MOTOR VEHICLE

[75] Inventors: Kouzo Maeda; Munemasa Shimamura, both of Yokohama; Hideo Omura; Makoto Hikone, both of Yokosuka, all of Japan

[73] Assignee: Nissan Motor Co., Ltd., Yokohama, Japan

[21] Appl. No.: 308,903

[22] Filed: Feb. 8, 1989

[30] Foreign Application Priority Data

Feb. 10, 1988 [JP] Japan ................................. 63-29625

[51] Int. Cl.$^5$ ............................................. B60R 21/02
[52] U.S. Cl. ................................... 280/777; 280/750; 74/552
[58] Field of Search .................. 280/777, 750; 74/552, 74/556, 492

[56] References Cited

U.S. PATENT DOCUMENTS

| | | | |
|---|---|---|---|
| 3,948,118 | 4/1976 | Garbin | 280/777 |
| 4,390,193 | 6/1983 | Strahan et al. | 280/777 |
| 4,709,944 | 12/1987 | Hongo et al. | 280/777 |

Primary Examiner—Kenneth R. Rice
Attorney, Agent, or Firm—Pennie & Edmonds

[57] ABSTRACT

Herein disclosed is a steering wheel construction which comprises a circular rim; a hub adapted to connect to a steering shaft; at least one spoke connecting the circular rim and the hub; a center pad supported by the spoke and located at a generally center portion of the circular rim; and an energy absorbing structure positioned between the hub and the center pad, wherein the energy absorbing structure is so arranged as to be deformed when the spoke is subjected to deformation.

34 Claims, 19 Drawing Sheets

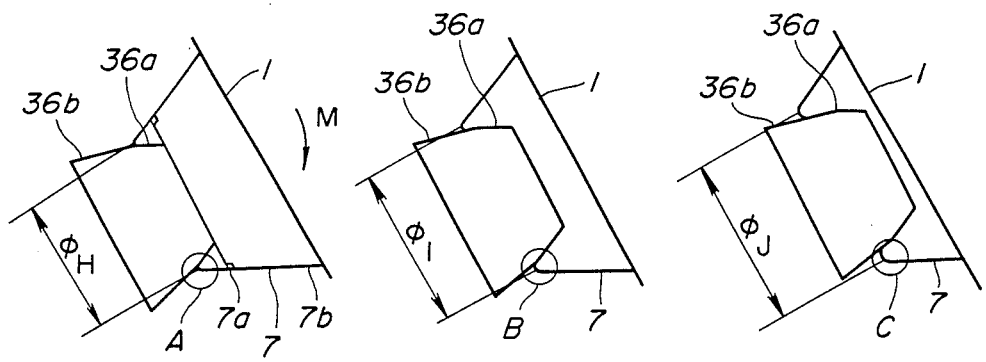
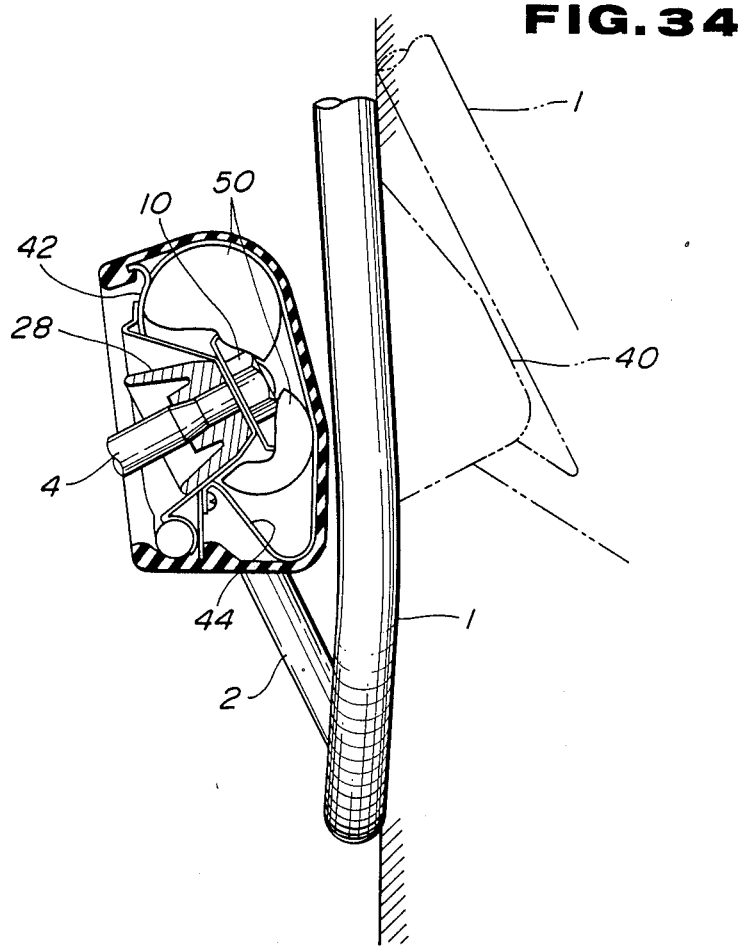

FIG.35
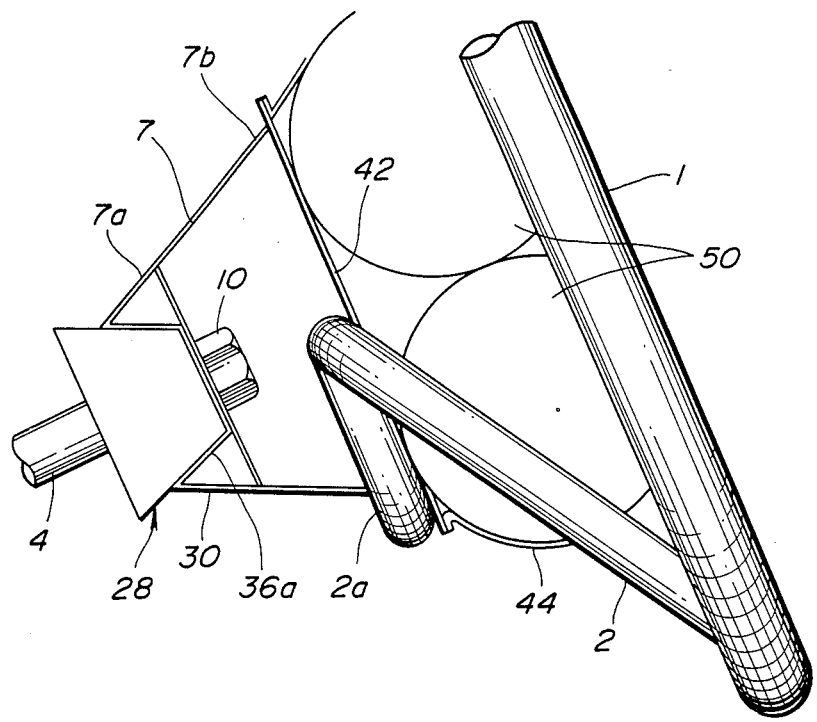
FIG.37   FIG.36
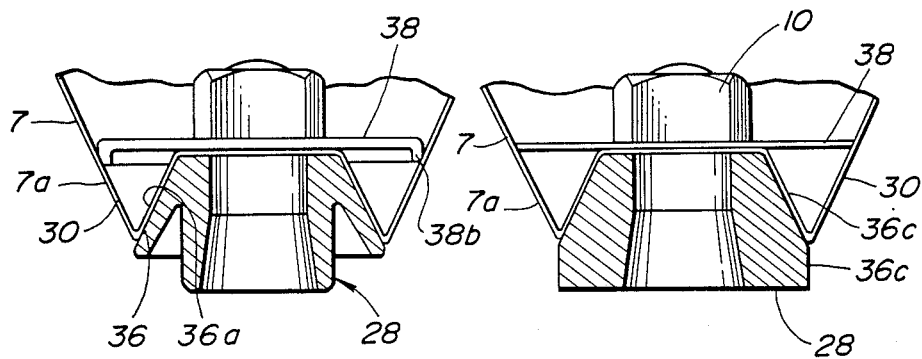

STEERING WHEEL CONSTRUCTION OF MOTOR VEHICLE

BACKGROUND OF THE INVENTION

1. Field of the Invention

The present invention relates in general to steering wheels of wheeled motor vehicles, and more particularly to steering wheel constructions of a type which is designed to positively absorb abnormal shock applied thereto by a driver upon a vehicle collision or the like.

2. Description of the Prior Art

In order to clarify the task of the present invention, one conventional steering wheel construction of the above-mentioned type will be described with reference to FIGS. 46 and 47, which is shown in Japanese Utility Model Second Provisional Publication No. 49-22096.

As is shown in FIG. 46, the steering wheel construction comprises generally a circular rim 1, spokes 2 and a hub 3 which are mounted on a steering shaft 4. The hub 3 is covered with a center pad 5 within which a known energy absorbing member is operatively installed.

When, as is seen from FIG. 47, the vehicle encounters a vehicle collision or the like, the chest of the driver collides violently against a lower end of the rim 1 deforming the hub 3 in such a way that the entire of the rim 1 safely holds the driver's chest.

When thereafter the driver's head collides against the center pad 5, the energy absorbing member is deformed to protect the head.

However, this steering wheel construction needs a number of parts due to its inherency originating from the arrangement wherein the shock absorbing member or structure is provided for each of the rim 1 and the center pad 5. As is known, when the number of parts on the steering wheel construction increases, it becomes difficult to provide the construction with a sufficient space for carrying out effective shock absorbing deformation of the shock absorbing members.

SUMMARY OF THE INVENTION

It is therefore an object of the present invention to provide a steering wheel construction of shock absorbing type, which is free of the above-mentioned drawbacks.

According to the present invention, there is provided a steering wheel construction of shock absorbing type, which is constructed to permit the shock absorbing member to exhibit a sufficient shock absorbing operation.

According to the present invention, there is provided a steering wheel construction which comprises a circular rim; a hub adapted to connect to a steering shaft; at least one spoke connecting the circular rim and the hub; a center pad supported by the spoke and located at a generally center portion of the circular rim; and an energy absorbing structure positioned between the hub and the center pad, wherein the energy absorbing structure is so arranged as to be deformed when the spoke is subjected to deformation.

BRIEF DESCRIPTION OF THE DRAWINGS

Figure 31:
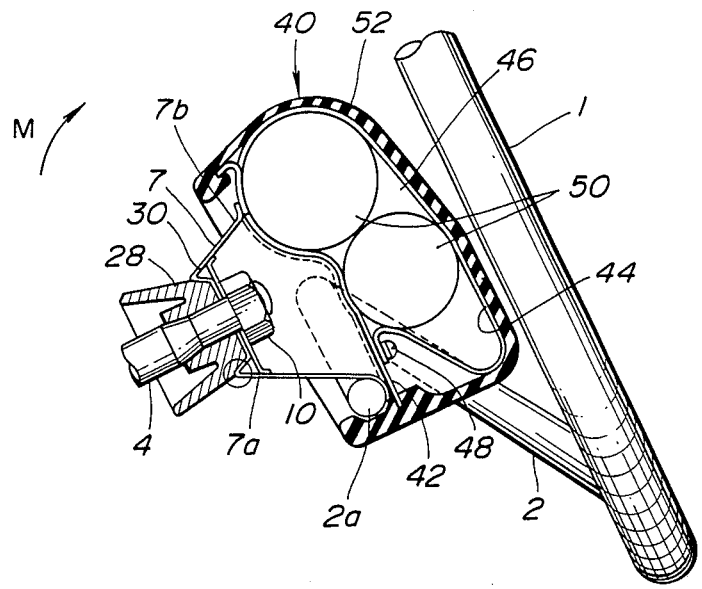

Other objects will be apparent from the following description when taken in conjunction with the accompanying drawings, in which:

FIGS. 1 to 4 are drawings showing a steering wheel consruction of a first embodiment of the present invention, in which FIG. 1 is a sectional view taken along the line I—I of FIG. 2, FIG. 2 is a front view of the construction, and FIGS. 3 and 4 are views similar to FIG. 1, but showing respective conditions before and after deformatin of, the construction;

FIGS. 5 to 7 are drawings showing a steering wheel construction of a second embodiment of the present invention, in which FIG. 5 is a front view of the construction, FIG. 6 is a sectional view taken along the line VI—VI of FIG. 5, and FIG. 7 is a graph showing an energy absorbing characteristic of the construction of the second embodiment with respect to a load applied thereto;

FIGS. 8 to 10 are drawings showing a steering wheel construction of a third embodiment of the invention, in which FIG. 8 is a front view of the construction, FIG. 9 is a sectional view taken along the line IX—IX of FIG. 8, and FIG. 10 is a view similar to FIG. 9, but showing a condition wherein the construction is deformed;

FIGS. 11 to 17 are drawings showing a steering wheel construction of a fourth embodiment of the invention, in which FIG. 11 is a front view of the construction, FIG. 12 is a sectional view taken along the line XII—XII of FIG. 11, FIGS. 13A and 13B are perspective views of an energy absorbing member showing respective conditions before and after deformation of the energy absorbing member, FIG. 14 is a graph showing an energy absorbing characteristic of the construction of the fourth embodiment with respect to a load applied thereto, FIG. 15 is a view similar to FIG. 12, but showing a condition wherein the construction is deformed, FIG. 16 is an illustration showing a condition wherein the construction is maximally deformed, and FIG. 17 is a view similar to FIG. 12, but showing a modification of the fourth embodiment;

FIGS. 18 to 24 are drawings showing a steering wheel construction of a fifth embodiment of the invention, in which FIG. 18 is a sectional view of the construction, FIG. 19 is an illustration of a part of the construction, FIGS. 20 and 21 are sectional views of the construction of the fifth embodiment showing respective conditions before and after deformation of the construction, FIG. 22 is a graph showing an energy absorbing characteristic of the construction with respect to a load applied thereto, and FIGS. 23 and 24 are views similar to FIG. 20, but showing modifications of the fifth embodiment;

FIGS. 25 to 30 are drawings showing a steering wheel construction of a sixth embodiment of the invention, in which FIG. 25 is a sectional view of the construction, FIG. 26 is a plan view of a part of the construction, FIG. 27 is a partial sectional view of the construction, FIG. 28 is a view similar to FIG. 27, but showing a condition wherein the construction is deformed, FIG. 29 is a graph showing an energy absorbing characteristic of the construction with respect to a load applied thereto, and FIG. 30 is a view similar to FIG. 27, but showing a modification of the sixth embodiment;

FIGS. 31 to 34 are drawings showing a steering wheel construction of a seventh embodiment of the invention, in which FIG. 31 is a sectional view of a part of the construction, FIG. 32 is an enlarged view of a part of FIG. 31, FIGS. 33A, 33B and 33C are schematical views of the construction, showing the process in which the consrruction is being deformed, and FIG. 34 is a view similar to FIG. 31, but showing a condition wherein the construction is deformed;

Figure 45:
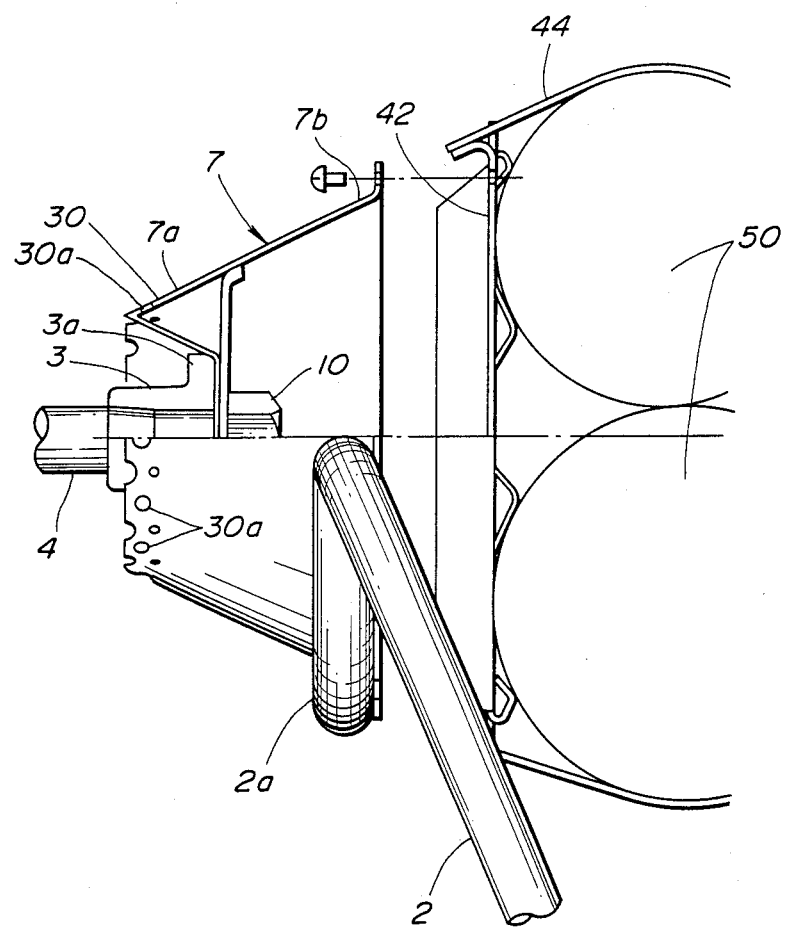
Figure 46:
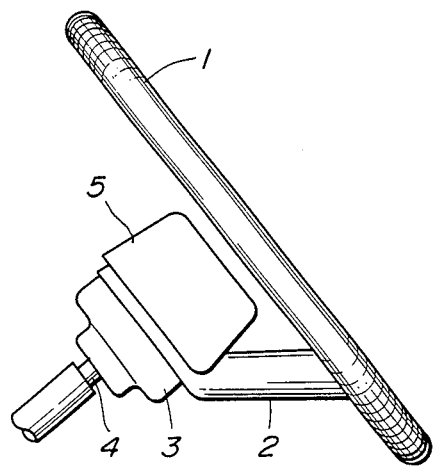
Figure 47:
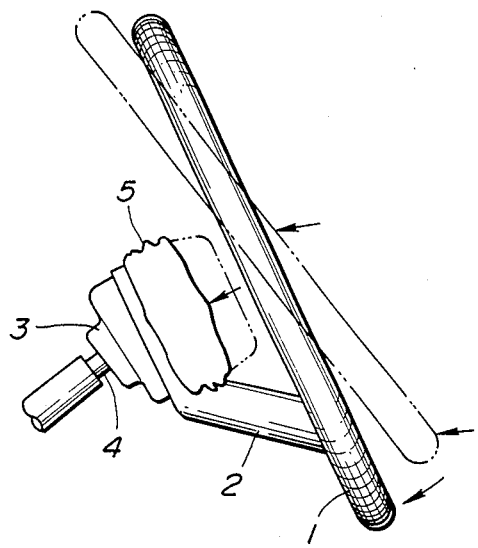

FIG. 35 is a partial sectional view of a steering wheel construction of an eighth embodiment of the invention;

FIG. 36 is a partial sectional view of a steering wheel construction of a ninth embodiment of the invention;

FIG. 37 is a view similar to FIG. 36, but showing a tenth embodiment of the invention;

FIGS. 38 to 44 are sectional views of guide members employable in the invention;

FIG. 45 is a partial sectional view of a steering wheel construction of an eleventh embodiment of the invention; and FIGS. 46 and 47 are side views of a conventional steering wheel construction, showing respective conditions before and after a defomation of the construction.

DETAILED DESCRIPTION OF THE INVENTION

In the following the present invention will be described in detail with reference to the accompanying drawings. Throughout the description, like parts and like structures are denoted by the same numerals.

Referring to FIGS. 1 to 4, there is shown a steering wheel construction of a first embodiment of the present invention.

Figure 1:
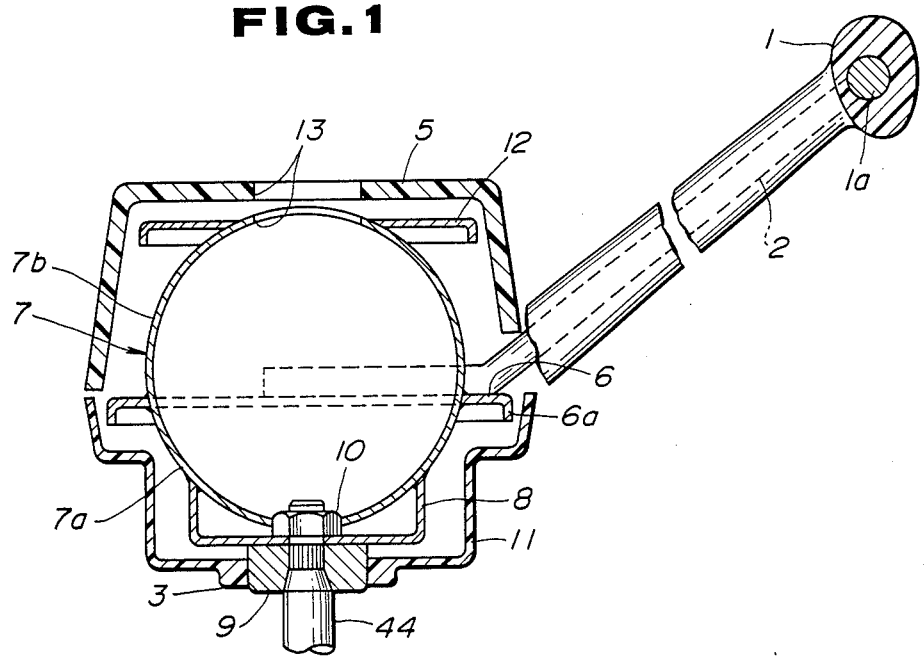
Figure 2:
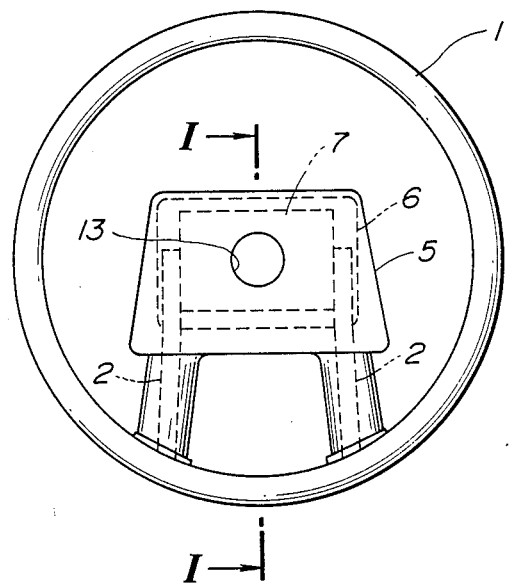

As is seen from FIG. 1, a plastic circular rim 1 of the construction has a metal core 1a tightly embedded therein. Two spokes 2 extend inward from the metal core 1a toward a hub 3. The inwardly extending portions of the spokes 2 are connected to an apertured mounting plate 6 which has a side flange 6a.

A cylindrical energy absorbing member 7 of metal is mounted on the mounting plate 6 having a lower part projected downward through the aperture of the plate 6. For achieving tight connection between the mounting plate 6 and the energy absorbing member 7, welding is applied to the mutually contact portions of them.

To an upper part of the energy absorbing member 7, there is secured an impact force receiving the purpose of which will be described hereinafter.

To a lower part of the energy absorbing member 7, there is connected a channel-like support member 8 which has side walls welded to the lower part. The support member 8 is securedly connected to a steering shaft 4 to rotate therewith. For the connection, a nut 10 is used, which is engaged with a threaded top portion of the steering shaft 4.

An upper half 7b of the energy absorbing member 7 (more specifically, the part positioned above the mounting plate 6) is housed in a center pad 5, while a lower half 7a of the member 7 (more specifically, the part positioned below the mounting plate 6) is housed in a lower cover 11.

As is seen from FIG. 1, the center pad 5 and the energy absorbing member 7 have aligned bores 13. These bores 13 are used for inserting therethrough a suitable tool for manipulating the nut 10. However, usually, the bore 13 of the center pad 5 is plugged with a decorative lid (not shown).

Figure 3:
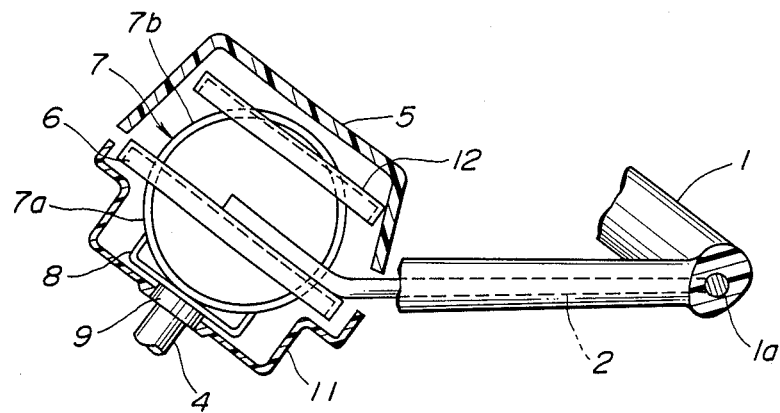

In the following, operation will be described with reference to FIGS. 3 and 4.

Figure 4:
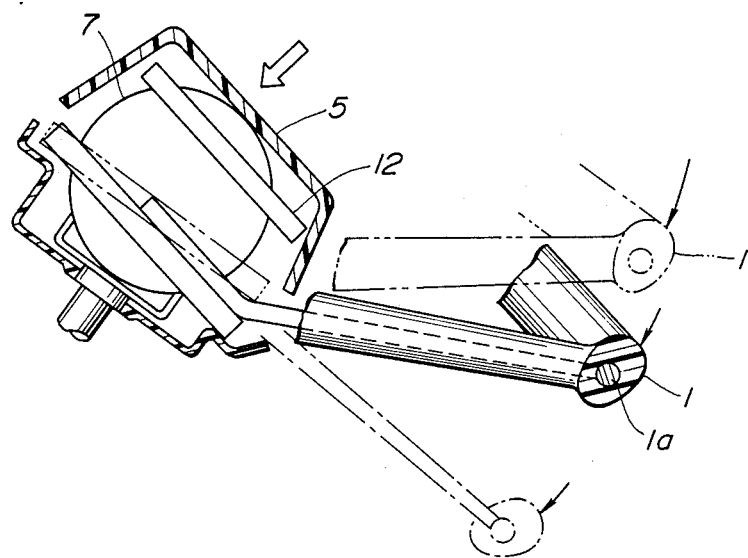

When, due to a vehicle collision or the like, the chest of a driver collides against the lower part of the rim 1, the rim 1 is inclined downward deforming or breaking the lower half 7a of the cylindrical energy absorbing member 7 as is seen from FIG. 4. That is, upon the collision, the impact energy is transmitted through the spokes 2 and the mounting plate 6 to the lower half 7a of the energy absorbing member 7 to deform the same. With this, the energy is absorbed and the steering wheel is inclined in such a way that the entire of the rim 1 holds evenly and safety the chest of the driver. In fact, the inclination of the steering wheel brings about increase in the contact area between the rim 1 and the chest of the driver, which protects the driver.

If the impact energy is too great, the spokes 2 are also deformed absorbing the energy.

When, thereafter, a driver's head collides against the center pad 5 of the hub 3, the impact energy is transmitted through the plate 12 to the upper half 7b of the energy absorbing member 7 and deforms the same. Thus, the energy is absorbed by the upper half 7b of the member 7 thereby protecting the driver's head.

When the impact force applied to the center pad 5 is too great, the force deforms also the lower half 7a of the energy absorbing member 7.

As is seen from the above description, in the first embodiment, the lower half 7a of the cylindrical energy absorbing member 7 functions to absorb the impact force applied to the rim 1, while the upper half 7b of the member 7 functions to absorb the impact force applied to the center pad 5. In other words, the single cylindrical energy absorbing member 7 serves as two energy absorbing means, which induces reduction in number of parts mounted on the steering wheel construction. Thus, unlike the case of the aforementioned conventional one, the steering wheel construction of the invention is permitted to exhibit a sufficient shock absorbing operation.

Figure 5:
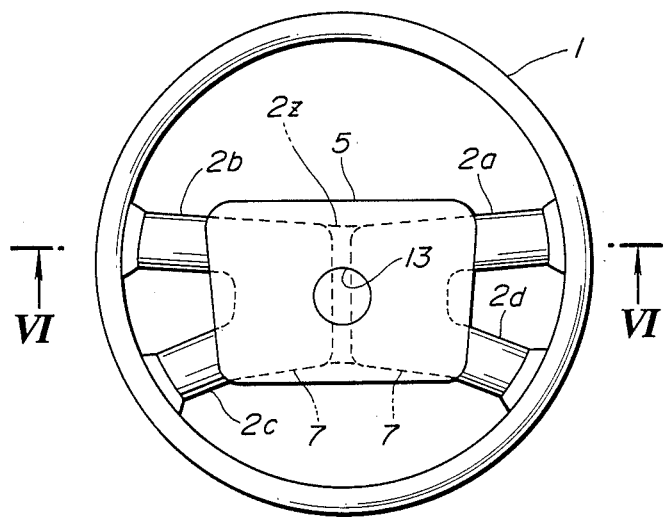
Figure 6:
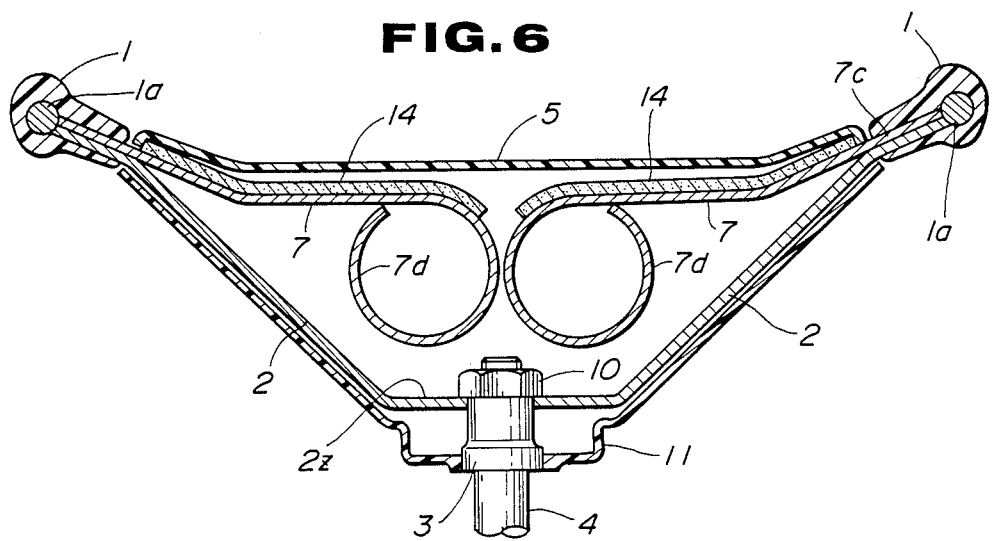
Figure 7:
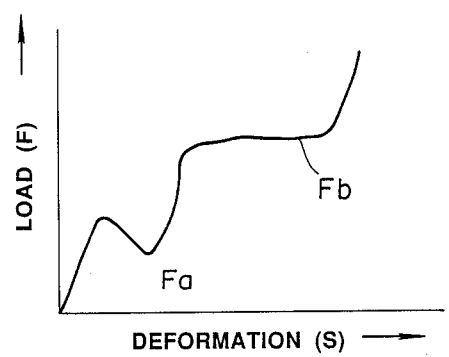

Referring to FIGS. 5 to 7, there is shown a steering wheel construction of a second embodiment of the present invention.

As is seen from FIGS. 5 and 6, a plastic circular rim 1 of the construction has a metal core 1a tightly installed therein. Four spokes 2a, 2b, 2c and 2d extend inward from the metal core 1a toward a hub 3. As is seen from FIG. 6, the four spokes 2a, 2b, 2c and 2d are united at their inward ends to form a flat base portion 2z. The flat portion 2z is securedly connected to a steering shaft 4 through a hub 3. For this connection, a nut 10 is engaged with a threaded top of the steering shaft 4, as shown.

Two identical energy absorbing members 7 are employed in this second embodiment, which are arranged symmetrically at a position above the flat base portion 2z of the spokes 2a, 2b, 2c and 2d. Each energy absorbing member 7 has two outwardly extending arms 7c secured to the metal core 1a in the rim 1 and a cylindrical inner portion 7d located near the nut 10. The front face of each energy absorbing member 7 is covered with a suitable cushion layer 14. A rectangular center pad 5 is arranged to cover the energy absorbing members, and a back cover 11 is arranged to cover the back surface of the spokes 2a, 2b, 2c and 2d.

The center pad 5 is formed with a bore 13 through which a suitable tool is inserted to manipulate the nut 10.

When, due to a vehicle collision or the like, a driver collides against the center pad 5, the cylindrical inner portions 7d of the energy absorbing members 7 are pressed against the flat base portion 2z of the spokes 2a, 2b, 2c and 2d and are thus deformed while absorbing the impact energy. At the same time, when the driver collides against the rim 1, the spokes 2a, 2b, 2c and 2d are deformed. By this deformation, the outwardly extending arms 7c of the energy absorbing members 7 are also deformed absorbing the impact energy.

FIG. 7 is a graph showing a character of the energy absorbing member 7. The energy absorbing member 7 is constructed to absorb an impact energy applied thereto by making an interaction between a bending load Fa applied to the outwardly extending arms 7c and a deforming load Fb applied to the cylindrical inner portion 7d. Thus, by varying the clearance between the cylindrical inner portion 7d of each energy absorbing member 7 and the flat base portion 2z of the spokes 2a, 2b, 2c and 2d, the characteristic of the energy absorbing member 7 can be controlled to a desired one.

Figure 8:
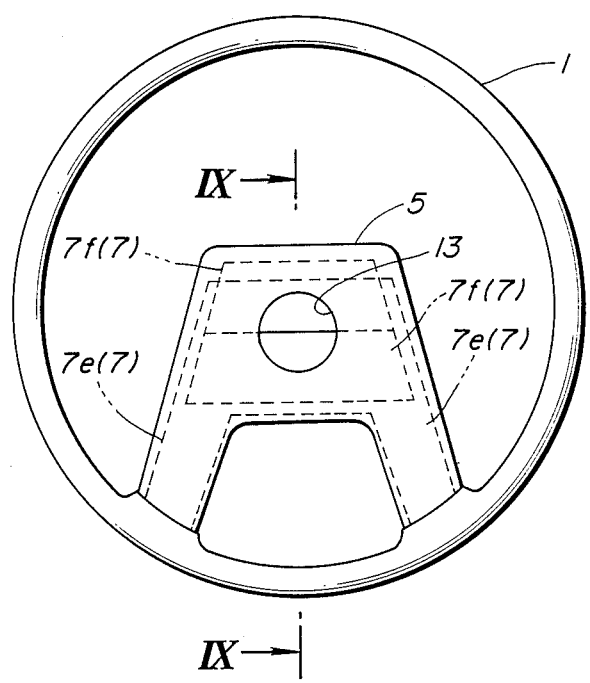
Figure 9:
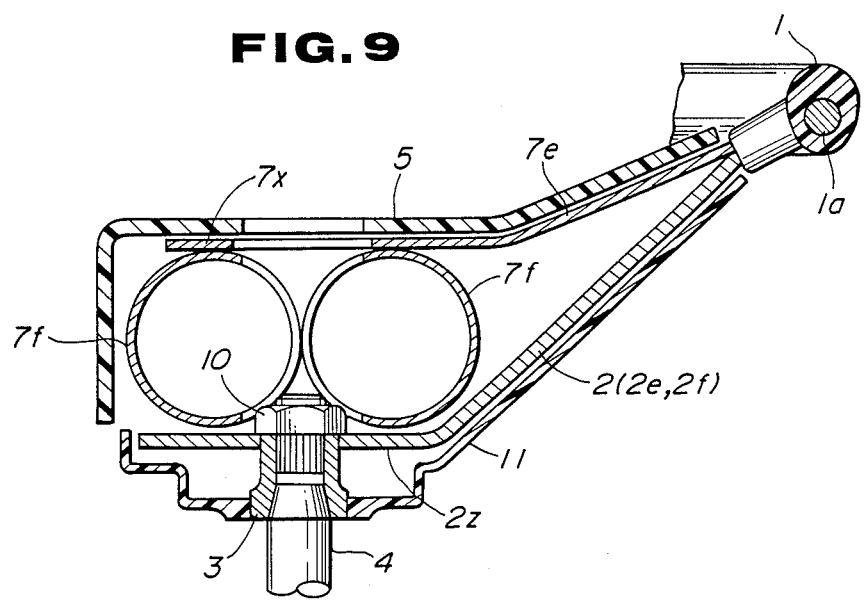
Figure 10:
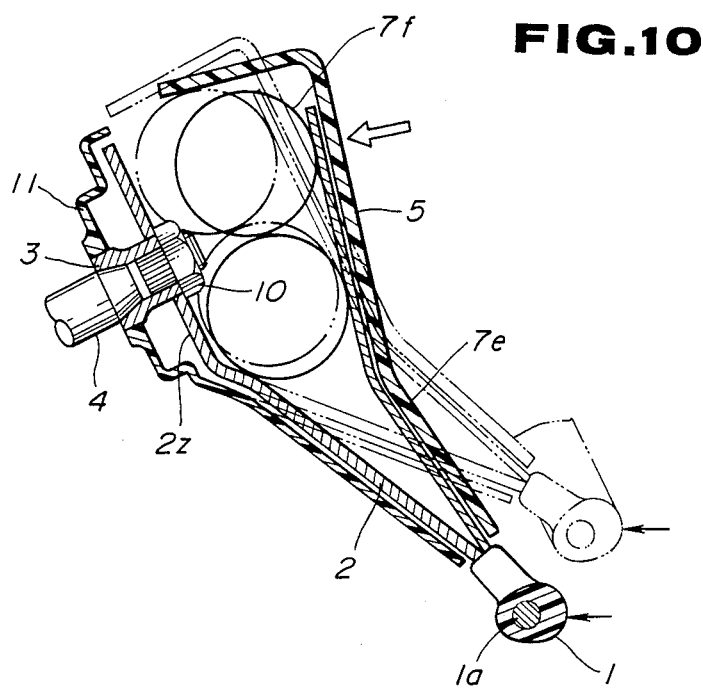

Referring to FIGS. 8 to 10, there is shown a steering wheel construction of a third embodiment of the present invention.

In this third embodiment, only two spokes 2e and 2f are employed. As is seen from FIGS. 8 and 9, the energy absorbing member 7 employed in this embodiment comprises two outwardly extending arms 7e each extending along the corresponding spoke 2e or 2f and being secured to the metal core 1a of the rim 1, and a base portion 7x to which two identical cylinder members 7f of metal are connected. Similar to the case of the second embodiment, the two cylinder members 7f are located near the flat base portion 2z of the two spokes 2e and 2f.

When, due to a vehicle collision or the like, a driver collides against a lower part of the steering wheel rim 1, the steering wheel is inclined downward deforming the spokes 2e and 2f in such a manner as is shown in FIG. 10. Due to deformation of the spokes, the two cylinder members 7f are raised from the flat base portion 2z increasing a so-called crash stroke of the energy absorbing member 7. The increase in crash stroke provides adequate shock absorbing against a subsequent collision of a driver's head against the raised center pad 5.

Referring to FIGS. 11 to 17, there is shown a steering wheel construction of a fourth embodiment of the invention.

In this embodiment, four spokes 2a, 2b, 2c and 2d are employed, which are secured at their outward ends to the metal core 1a of the steering wheel rim 1. These spokes 2a, 2b, 2c and 2d are united at their inward ends to form a flat base portion 2z which is securedly connected to the steering shaft 4 through a hub 3. For this connection, a nut 10 is used, which is engaged with a threaded top of the steering shaft 4. A rectangular center pad 5 covers a central part of the rim 1, and a back cover 11 covers the back of the spokes.

Figure 11:
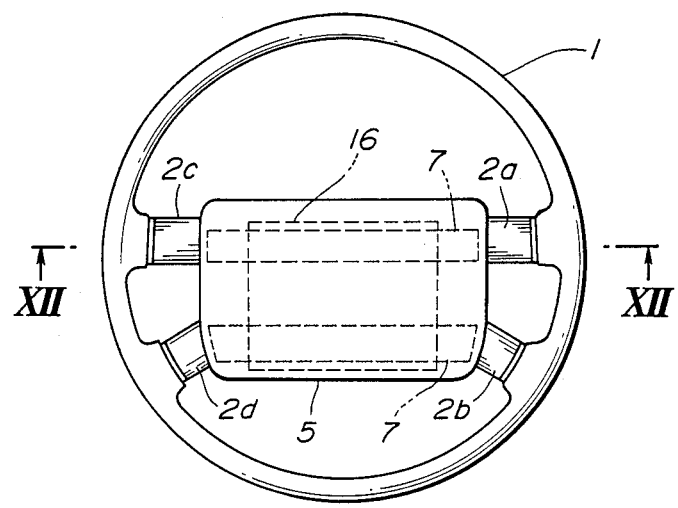
Figure 12:
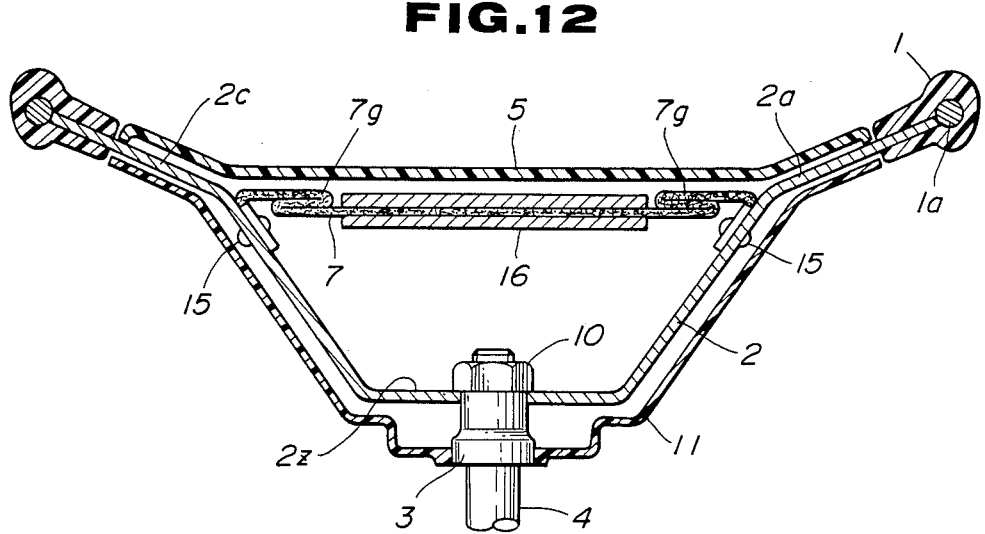
Figures 13A, 13B:
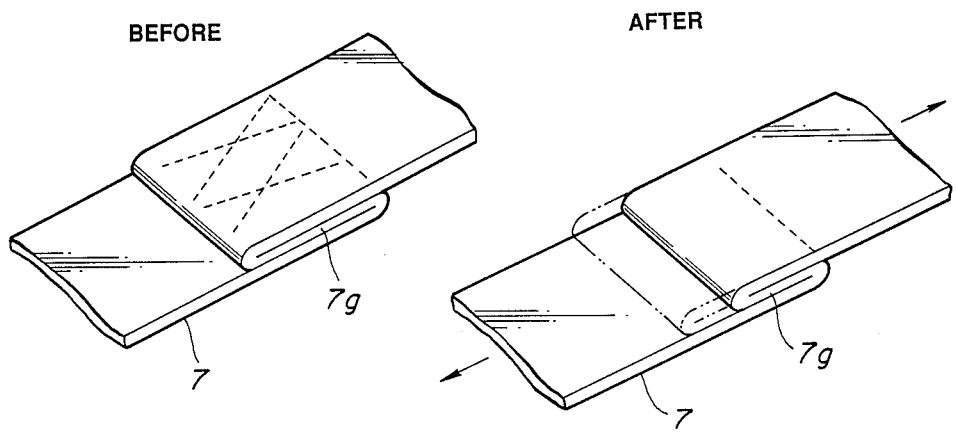

As is best seen from FIGS. 11 and 12, two beltlike energy absorbing members 7 are employed, one extending between the spokes 2a and 2c, and the other extending between the spokes 2b and 2d. Rivets 15 are used for the connection between each energy absorbing member 7 and the corresponding spoke.

Each energy absorbing member 7 comprises a strap of woven cloth or the like which has opposed end portions 7g folded and sewed. Both ends of the strap are secured to the corresponding spokes by the rivets 15. A rectangular plate 16 is disposed on both of the energy absorbing members 7 and secured to the same.

Figure 14:
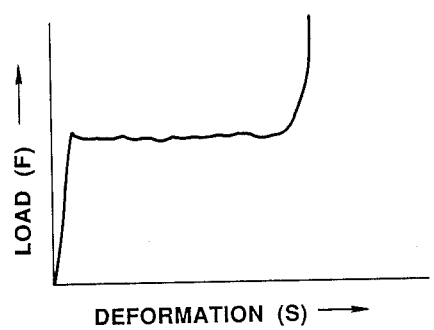
Figure 15:
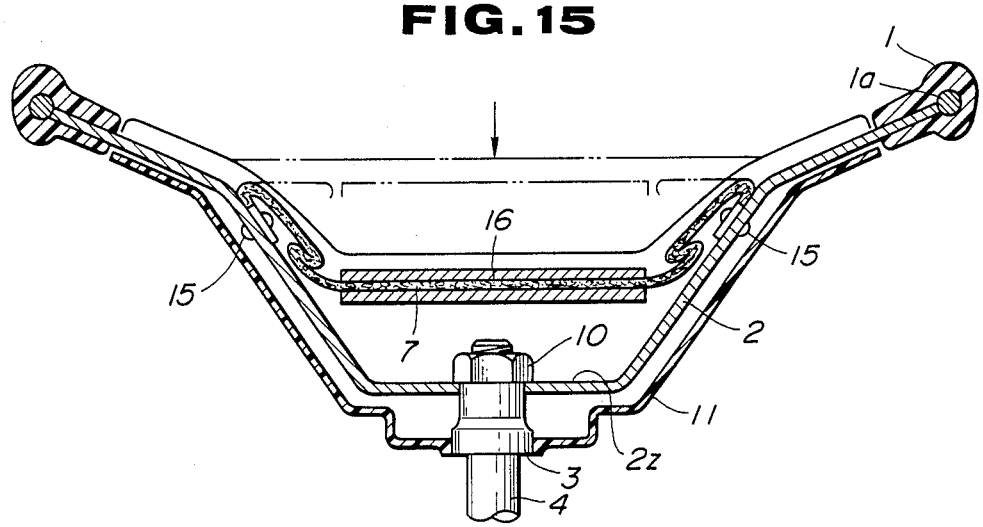

When, due to a vehicle collision, a driver's head or the like collides against the center pad 5 of the steering wheel, an impact force is applied to the energy absorbing members 7 through the plate 16. Upon this, each energy absorbing member absorbs the impact energy by breaking or unsewing the sewed folded portions 7g. The manner in which the impact force is absorbed by the energy absorbing member 7 is depicted by the graph of FIG. 14.

Figure 16:
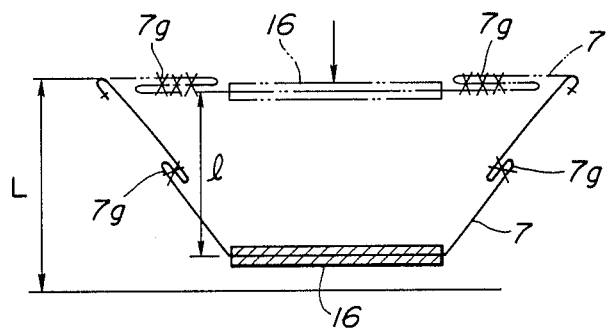

As may be understood from FIG. 16, by varying the length of each folded sewed portion 7g, a so-called shock absorbing stroke (l) of the energy absorbing member 7 can be adjusted. Of course, the stroke (l) should be smaller than the distance (L) between the top of the steering shaft 4 and the energy absorbing member 7 in normal position.

When, due to a vehicle collision, the driver collides against the lower part of the steering wheel rim 1, the steering wheel is inclined downward applying impact force to the energy absorbing members 7. Thus, energy absorbing operation is carried out by the members 7.

Figure 17:
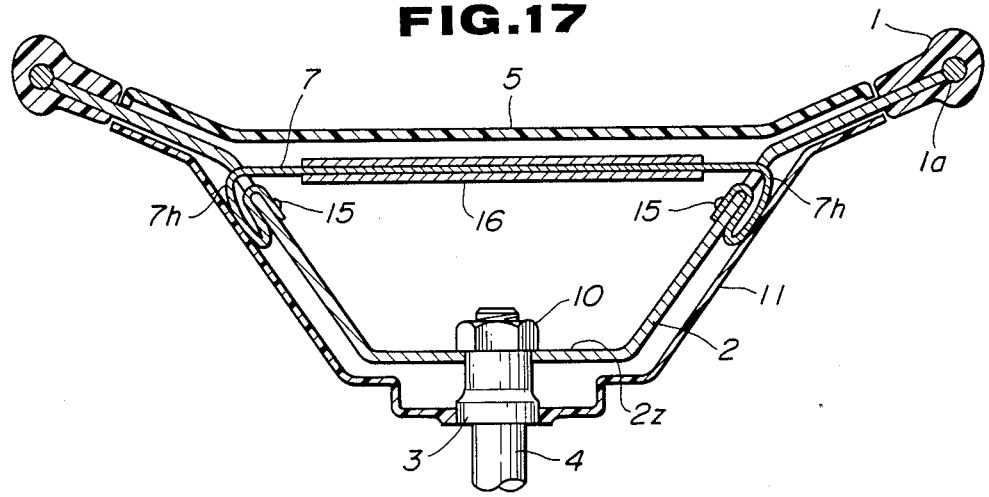

If desired, as is shown in FIG. 17, in place of the above-mentioned energy absorbing members 7 constructed of woven cloth, energy absorbing members 7 made of steel belt may be also used. In this modification, each steel belt 7 has opposed end portions 7h folded.

Referring to FIGS. 18 to 24, there is shown a steering wheel construction of a fifth embodiment of the present invention.

Figure 18:
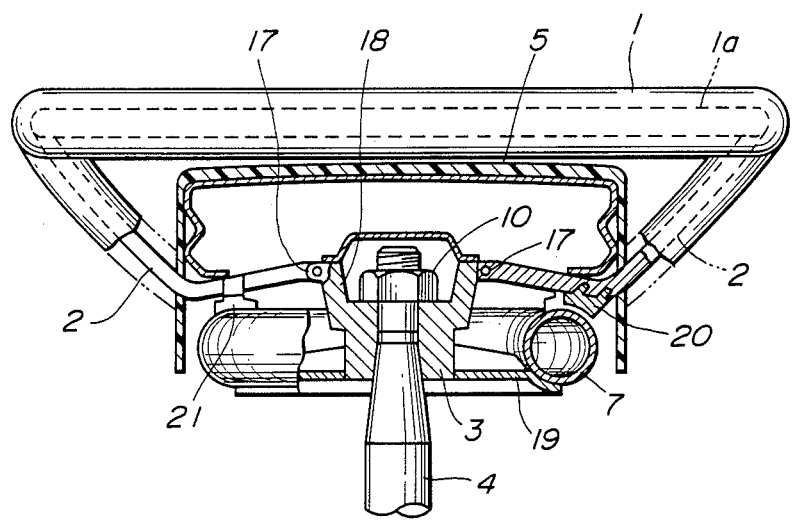
Figure 19:
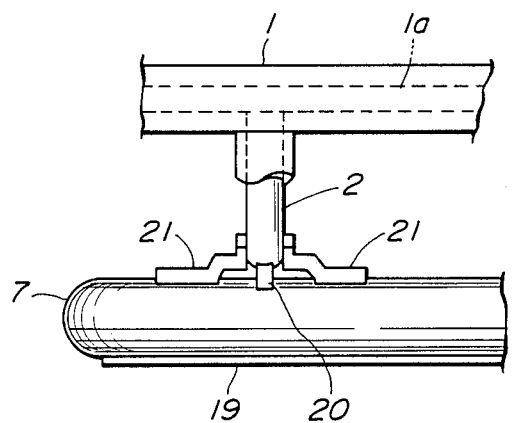

As is seen from FIG. 18, in this embodiment, each spoke 2 extending inward from the metal core 1a of the steering wheel rim 1 is pivotally connected through a pin 17 to the hub 3 bolted to the steering wheel 4. For the pivotal connection with the spoke 2, the hub 3 has a projection 18 to which the spoke 2 is pivotally connected. The hub 3 has a supporting bracket 19 secured to a lower part of the hub 3. An annular tubular metal member 7, which serves as the energy absorbing member, is disposed on the supporting bracket 19 in a manner to surround the hub 3. If desired, the annular tubular member 7 may be filled with suitable liquid. Each spoke 2 has at its middle part a press member 20 which faces the annular tubular member 7. As is seen from FIG. 19, a pair of brackets 21 are secured to the annular tubular member 7, which slidably put therebetween a suitable portion of the spoke 2 to hold the same. A center pad 5 covers a center zone of the steering wheel.

Figure 20:
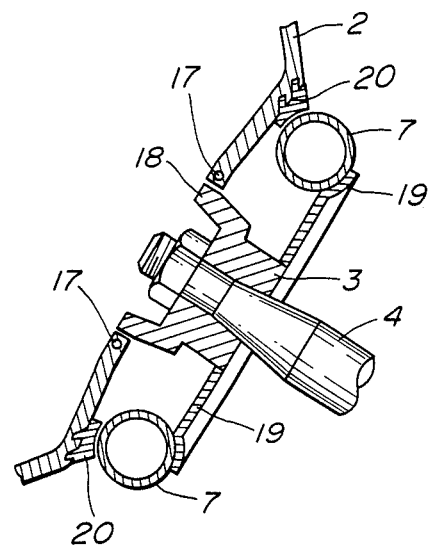
Figure 21:
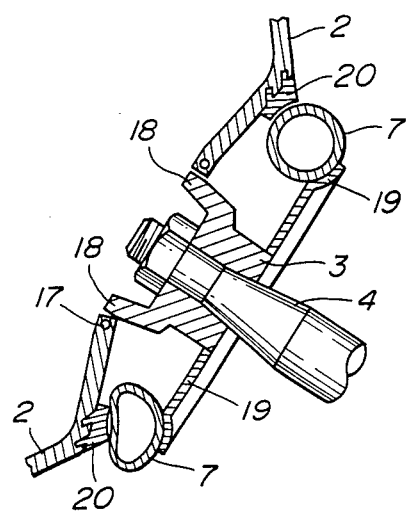

When, due to a vehicle collision, a driver collides against the lower part of the steering wheel rim 1, the spoke 2 assuming a lower position is pivoted downward about the associated pivot pin 17 deforming the annular tubular member 7, as is seen from FIGS. 20 and 21. With this, the impact energy is absorbed.

Figure 22:
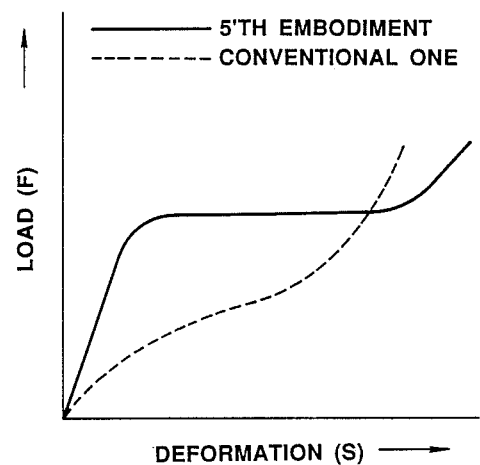

FIG. 22 is a graph showing the energy absorbing characteristics of the fifth embodiment and a conventional steering wheel construction. As is seen from this graph, in the fifth embodiment, the load required for deforming the energy absorbing member 7 at the initial stage of the shock absorbing operation is much higher than that in the conventional one. This means that an optimum shock absorbing effect is expected even if the cone of the steering wheel has only a shallow depth.

Figure 23:
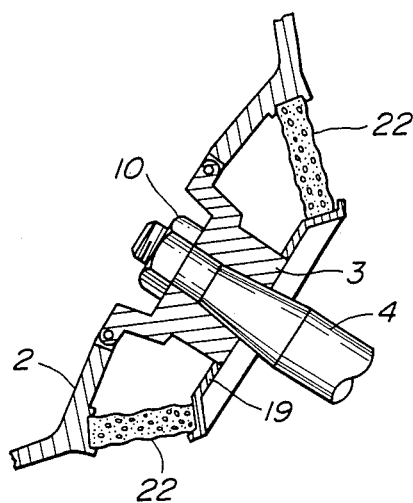

If desired, as is shown in FIG. 23, a mesh type jacket tube 22 may be used in place of the above-mentioned annular tubular member 7.

Figure 24:
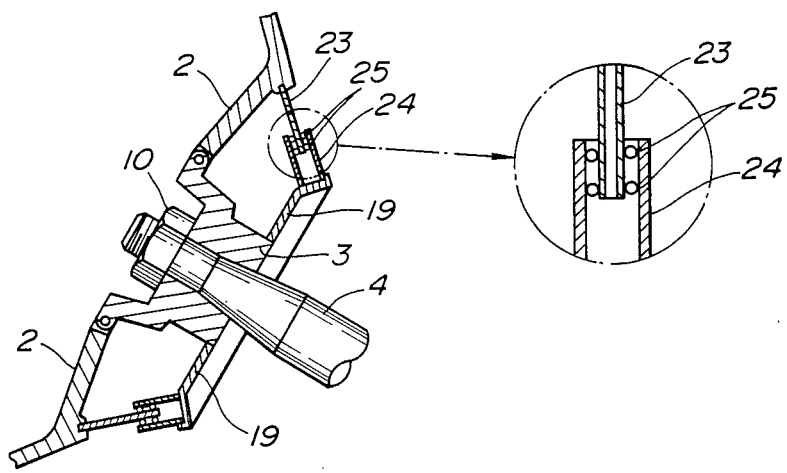
Figure 25:
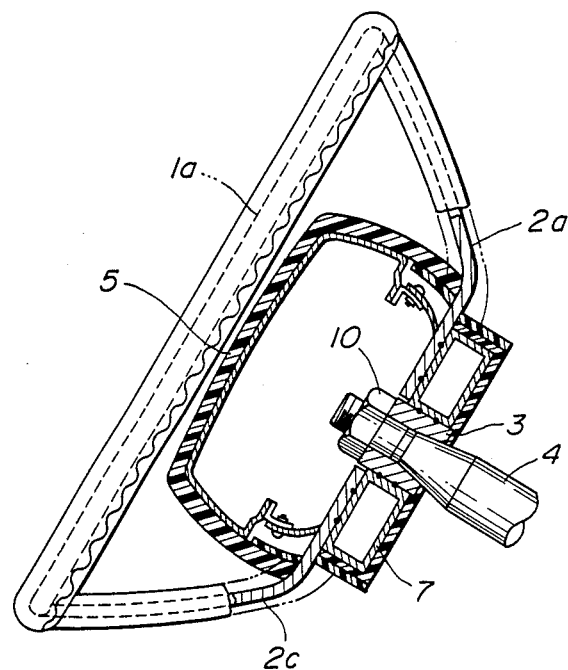
Figure 26:
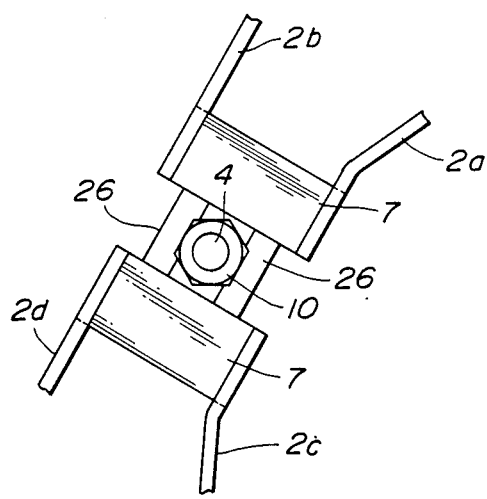
Figure 27:
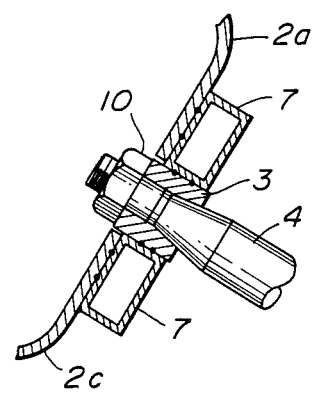

Further, if desired, as is shown in FIG. 24, a telescope type energy absorbing device may be used. The device comprises an outer metal tube 24 connected to the supporting bracket 19, an inner metal tube 23 received in the outer tube 23 and connected to the spoke 2, and a plurality of steel balls 25 each being tightly disposed between the inner and outer tubes 23 and 24. That is, upon pivotal movement of the spoke 2, the inner tube 23 is forced to slide in the outer tube 24 against a marked friction force produced between each ball 25 and each of the inner and outer tubes 23 and 24. Thus, impact energy is absorbed.

Referring to FIGS. 25 to 30, there is shown a steering wheel construction of a sixth embodiment of the present invention.

Four spokes 2a, 2b, 2c and 2d extend from the metal core 1a of the steering wheel rim 1. The spokes are bolted at their inner end portions to the steering shaft 4 through the hub 3. For this connection, a nut 10 is used, which is engaged with a threaded top of the steering shaft 4. A center pad assembly 5 is mounted at a center part of the steering wheel.

In this embodiment, two rectangular hollow members 7 of metal are used as energy absorbing means. These members 7 are located at diametrically opposed sides of the hub 3. Each member 7 is welded to both the spoke 2a, 2b, 2c or 2d and the hub 3. As is seen from FIG. 26, the two energy absorbing members 7 are connected through two reinforcing members 26.

Figure 28:
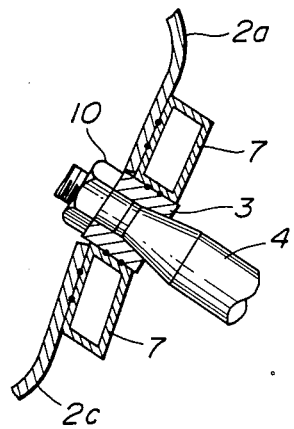

When, due to a vehicle collision or the like, a driver collides against the lower part of the steering wheel, the spokes 2c and 2d assuming a lower position are bent downward deforming the energy absorbing members 7, as will be seen from FIG. 28. With this, the impact energy is absorbed.

Figure 29:
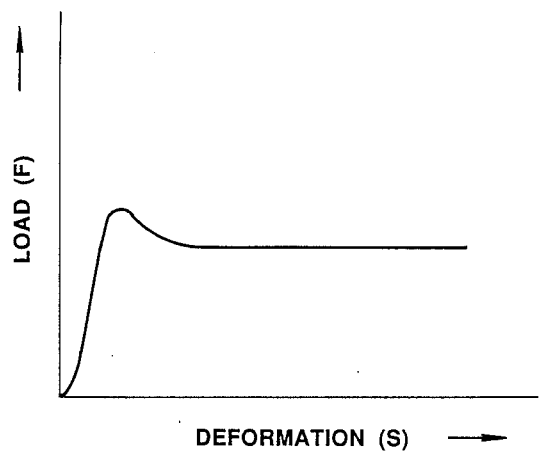

FIG. 29 is a graph showing the energy absorbing characteristic of the sixth embodiment.

Figure 30:
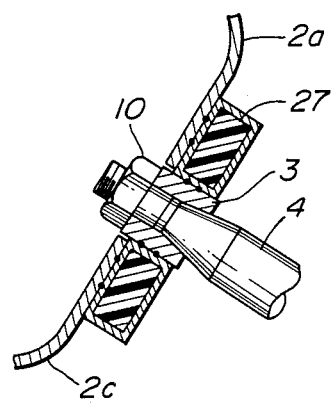

If desired, as is shown in FIG. 30, the interior of the hollow members 7 may be filled with an elastomer such as rubber, polyurethane or the like.

Referring to FIGS. 31 to 34, there is shown a steering wheel construction of a seventh embodiment of the present invention.

In this embodiment, a cone-shaped energy absorbing member 7 is employed, which is constructed of a resiliently deformable material, such as metal. The member 7 is bolted through a guide member 28 to the steering shaft 4 in a manner as will be described hereinafter.

The energy absorbing member 7 has a smaller diameter portion 7a located at the head of the steering shaft 4 and a larger diameter portion 7b directed toward the steering wheel rim 1.

Figure 32:
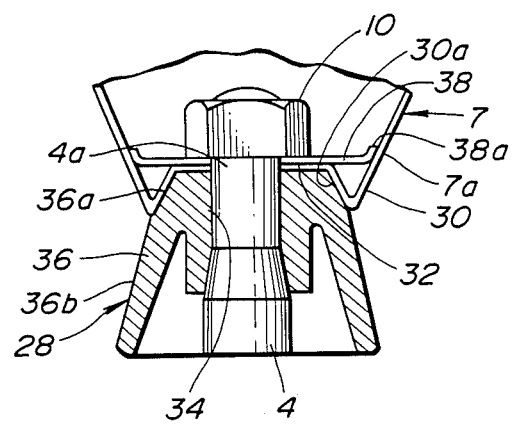

As is seen from FIG. 32, the smaller diameter portion 7a has an initially deforming portion 30. The portion is an annuar ridge 30 projected toward the steering shaft 4. The initially deforming portion or annular ridge 30 is provided by bending up the lower part of the member 7. Designated by numeral 32 is an apertured bottom wall 32 whose periphery is merged with an inner part of the initially deforming portion or annular ridge 30.

The guide member 28 has a thickness greater than the height of the initially defoming portion 30 of the energy absorbing member 7. The guide member 28 is shaped like a turning spin, comprising a bored center portion 34 and a skirt portion 36 which is concentrically arranged about the center portion 34. The bored center portion 34 passes therethrough a threaded top 4a of the steering shaft 4. A nut 10 is operatively engaged with the threaded top 4a.

The skirt portion 36 comprises a first tapered surface 36a which is received in a basin portion defined by the initially deforming portion 30 of the energy absorbing member 7, and a second tapered surface 36b which extends rearwardly and outwardly from the first tapered surface 36a. As is seen from FIG. 32, the angle of the first tapered surface 36a relative to the axis of the guide member 28 is greater than that of the second tapered surface 36b.

An inner washer 38 is disposed between the nut 10 and the bottom wall 32 of the energy absorbing member 7. The inner washer 38 has a raised periphery 38a pressed against an inner surface of the energy absorbing member 7. Due to provision of the raised periphery 38a of the washer 38, the connection of the energy absorbing member 7 to the guide member 28 is assuredly achieved.

As is seen from the drawings, upon proper assembly, the first tapered surface 36a of the guide member 28 is in intimate contact with an inner surface of the initially deforming portion 30 of the energy absorbing member 7, and an upper flat surface (not numeral) of the guide member 28 is in intimate contact with the bottom wall 32 of the energy absorbing member 7.

Referring back to FIG. 31, at the larger diameter portion 7b of the energy absorbing member 7, there is arranged a center pad assembly 40.

The center pad assembly 40 comprises an apertured lower plate 42 mounted on the larger diameter portion 7b of the energy absorbing member 7 and an upper plate 44 arranged over the lower plate 42 to define a certain inner space 46 therebetween. Designated by numeral 48 is a bolt for securing the two plates 42 and 44. Within the inner space 46, there is disposed a pillow-like cushion member 50. The upper plate 44 is covered with a center layer 52 which has a lower mouth portion held by a periphery of the lower plate 42.

A part of the larger diameter portion 7b of the energy absorbing member 7 is secured to an inward end portion 2a of the steering wheel spoke 2. In the illustrated embodiment, the inward end portion 2a of the spoke 2 is curved.

In the following, operation will be described with reference to FIGS. 31 and 33A to 33C.

When, due to a vehicle collision or the like, a driver collides against a lower part of the steering wheel, the impact force is transmitted through the spoke 2 to the energy absorbing member 7 producing angular moment M. Because of the tight connection between the smaller diameter portion 7a of the energy absorbing member 7 and the steering wheel 4, the impact force or stress is concentrated at the initially deforming portion 30 of the member 7. Thus, at the initial stage, the deformation of the energy absorbing member 7 takes place largely only at the initially deforming portion 30. With this partial deformation, the steering wheel is inclined to an angular position wherein entire of the rim 1 holds the chest of the driver. Thereafter, with increase of pressure applied to the steering wheel rim 1 by the driver, the energy absorbing member 7 is gradually deformed moving the deformed portion thereof from the smaller diameter portion 7a toward the larger diameter portion 7b. This gradual deformation of the energy absorbing member 7 is very advantageous in absorbing impact energy.

The process of the gradual deformation will be seen from FIGS. 33A to 33C. That is, as the deformed portion of the energy absorbing member 7 moves from the smaller diameter portion 7a to the larger diameter portion 7b, the diameter ($\phi$) of the deformed portion increases gradually from H to I and to J, as shown. Although this phenomenon brings about increase in counterforce of the energy absorbing member 7, the curvature of the deformed portion decreases from A to B and C cancelling the increase in the counterforce. Thus, a flat counterforce characteristic is obtained.

When the impact energy is too great, the steering wheel construction is forced to assume such a condition as shown in FIG. 34. That is, upon such violent collision, the upper portion of the steering shaft 4 is passed through the aperture of the lower plate 42 and violently strikes the cushion member 50. Thus, shock absorbing is effected by the cushion member 50 at this time.

Referring to FIG. 35, there is shown a steering wheel construction of an eighth embodiment of the present invention, which is a slight modification of the seventh embodiment of FIG. 31.

That is, in the eighth embodiment, the guide member 28 has only one tapered surface 28a which is intimately received in the initially deforming portion 30 of the energy absorbing member 7.

Referring to FIG. 36, there is shown a ninth embodiment of the present invention. In this embodiment, the inner washer 38 has not a flange at the periphery thereof, and the guide member 28 has a cylindrical surface 36c below the first tapered surface 36a.

Referring to FIG. 37, there is shown a tenth embodiment of the present invention. In this embodiment, the inner washer 38 has a peripheral flange 38b bent downward, and skirt portion 36 of the guide member 28 has only one tapered surface 36a.

Referring to FIGS. 38 to 44, there are shown various guide members 28 which are employable in the invention.

Figure 38:
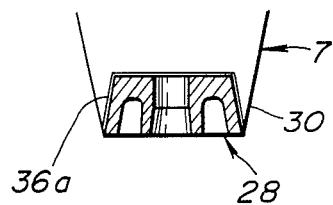
Figure 39:
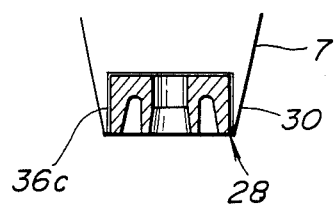
Figure 40:
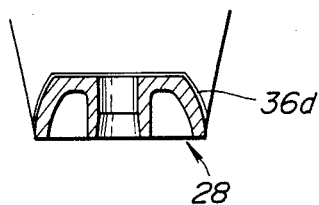
Figure 41:
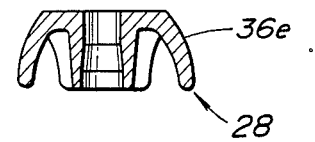
Figure 42:
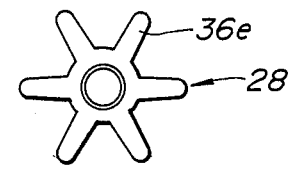

The guide members 28 shown in FIGS. 38 and 40 are of a type which has a thickness substantially the same as the depth of the initially deforming portion 30. The guide member 28 of FIG. 38 has a tapered surface 36a, while the guide member 28 of FIG. 39 has a cylindrical surface 36c.

Figure 43:
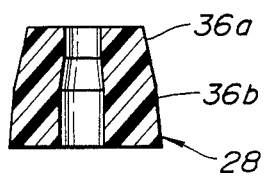
Figure 44:
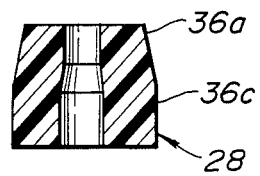

The guide members 28 shown in FIGS. 40 to 44 are of a type which has a thickness greater than the depth of the initially deforming portion 30. The guide member 28 shown in FIG. 40 has a spherical surface 36d, and the guide member 28 shown in FIGS. 41 and 42 comprises six arms each having a spherical outer surface 36e. The guide members 28 shown in FIGS. 43 and 44 are constructed of a rigid plastic. The guide member 28 of FIG. 43 has first and second tapered surfaces 36a and 36b, while the guide member 28 of FIG. 44 has a tapered surface 36a and a cylindrical surface 36c.

Referring to FIGS. 45, there is shown a steering wheel construction of an eleventh embodiment of the invention.

In this embodiment, there is no means corresponding to the above-mentioned guide member 28. That is, a hub 3 is employed, which has a larger diameter head portion 3a which is intimately received in the initially deforming portion 30 of the energy absorbing member 7. For promoting the deformation of the initially deforming portion 30, a plurality of small openings 30a are formed in the same, as shown.

During deformation of the energy absorbing member 7 due to a collision of a driver against the steering wheel, the deformed portion of the member 7 moves from the smaller diameter portion 7a to the larger diameter portion 7b reducing the curvature of the portion and thus reducing the counterforce by the member 7. Due to provision of the small openings 30a, the counterforce of the member 7 at the initial stage of the deformation is reduced thereby permitting balanced deformation of the member 7 throughout the length.

What is claimed is:

1. A steering wheel construction comprising:
    a circular rim;
    a hub adapted to connect to a steering shaft;
    at least one spoke connecting said circular rim and said hub;
    a center pad supported by said spoke and located at a generally center portion of said circular rim; and
    an energy absorbing structure positioned between said hub and said center pad, said energy absorbing structure comprising at least one cylindrical metal member,
    wherein said energy absorbing structure is so arranged as to be deformed when said spoke is subjected to deformation.

2. A steering wheel construction for use with a steering shaft, comprising:
    a circular rim;
    a hub connected to said steering shaft to rotate therewith;
    at least one spoke extending from said circular rim toward said hub;
    a center pad positioned at a generally center portion of said circular rim; and
    an energy absorbing structure positioned between said hub and said center pad, said energy absorbing structure being deformed to absorb an external energy when said center pad strongly collides against thereto; and a connecting structure for connecting said spoke to said hub, said connecting structure being so arranged as to deform said energy absorbing structure when said spoke is subjected to deformation.

3. A steering wheel construction for use with a steering shaft, comprising:
    a circular rim;
    a hub connected to said steering shaft to rotate therewith;
    at least one spoke extending from said circular rim toward said hub;
    a center pad positioned at a generally center portion of said circular rim; and
    an energy absorbing structure positioned between said hub and said center pad, said energy absorbing structure comprising at least one cylindrical metal member, and said energy absorbing structure being deformed to absorb an external energy when said center pad strongly collides against thereto; and a connecting structure for connecting said spoke to said hub, said connecting structure being so arranged as to deform said energy absorbing structure when said spoke is subjected to deformation.

4. A steering wheel construction as claimed in claim 1, in which said cylindrical metal member is so arranged that the axis thereof extends substantially perpendicular to the axis of said hub.

5. A steering wheel construction as claimed in claim 3 or 4, in which said cylindrical metal member is connected through a support member to said hub.

6. A steering wheel construction as claimed in claim 5, in which said cylindrical metal member is mounted on an apertured mounting plate having a lower part thereof projected to a back side of the mounting plate through the aperture of the same, said mounting plate being connected to said spoke.

7. A steering wheel construction as claimed in claim 6, further comprising an impact receiving plate which is secured to a top portion of said cylindrical metal member and faces to a back surface of said center pad.

8. A steering wheel construction as claimed in claim 2, 3 or 4, in which said energy absorbing structure comprises two identical energy absorbing members which are arranged symmetrically at a position between said hub and said center pad.

9. A steering wheel construction as claimed in claim 8, in which each energy absorbing member having an outwardly extending arm secured to said rim and a cylindrical inner portion located near said hub.

10. A steering wheel construction as claimed in claim 9, in which said energy absorbing member is lined with a cushion layer.

11. A steering wheel construction as claimed in claim 10, in which four spokes extend inwardly from said rim and are united at their inner portions to form a flat base portion, said flat base portion being connected by a bolt to said steering shaft through said hub.

12. A steering wheel construction as claimed in claim 11, in which said center pad is formed With a bore which is usually plugged with a lid.

13. A steering wheel construction as claimed in claim 2, 3 or 4, in which said energy absorbing structure comprises an outwardly extending arm which has an outward end secured to said rim and an inward end to which two cylindrical metal members are connected, said cylindrical metal members being positioned near said hub.

14. A steering wheel construction as claimed in claim 13, in which said two cylindrical metal members are identical in structure.

15. A steering wheel construction as claimed in claim 2, 3, or 4, in which said energy absorbing structure comprises two belt-like energy absorbing members which are arranged in parallel with each other, each member having both ends connected to diametrically opposed spokes of the steering wheel and comprising a strap of woven cloth which has opposed end portions folded and sewed.

16. A steering wheel construction as claimed in claim 15, further comprising a rectangular plate which is disposed on said two belt-like energy absorbing members.

17. A Steering wheel construction as claimed in claim 2, 3 or 4, in which said energy absorbing structure comprises two parallel steel belts each having opposed ends connected to diametrically opposed spokes of the steering wheel and having opposed end portions folded.

18. A steering wheel construction as claimed in claim 1, 2 or 3, in which said energy absorbing structure comprises:
a supporting bracket secured to said hub;
an annular tubular metal member disposed on said supporting bracket in a manner to surround said hub; and
means for deforming said annular tubular member when said spoke is deformed to a certain degree.

19. A steering wheel construction as claimed in claim 18, in which said means comprises:
a pin through which an inward end of said spoke is pivotally connected to said hub; and
a press member connected to said spoke, said press member facing said annular tubular member.

20. A steering wheel construction as claimed in claim 19, further comprising a pair of brackets which are secured to said annular tubular member and slidably put therebetween a part of said spoke.

21. A steering wheel construction as claimed in claim 1, 2 or 3, in which said energy absorbing structure comprises:

a supporting bracket secured to said hub;
a mesh type jacket tube disposed on said supporting bracket in a manner to surround said hub; and
means for deforming said mesh type jacket tube when said spoke is deformed to a certain degree.

22. A steering wheel construction as claimed in claim 21, in which said means comprises:
a pin through which an inward end of said spoke is pivotally connected to said but; and
a press portion formed on said spoke, said press portion being attached to said mesh type jacket tube.

23. A steering wheel construction as claimed in claim 1, 2 or 3, in which said energy absorbing structure comprises:
a supporting bracket secured to said hub;
a plurality of telescopically movable energy absorbing devices, each having one end connected to said supporting bracket; and
means for pressing and said telescopically movable energy absorbing devices when said spoke is deformed to a certain degree.

24. A steering wheel construction as claimed in claim 23, in which said means comprises:
a pin through which an inward end of said spoke is pivotally connected to said hub; and
a press portion formed on said spoke, said press portion being connected to the other end of each telescopically movable energy absorbing device.

25. A steering wheel construction as claimed in claim 24, in which each energy absorbing device comprises:
an outer metal tube connected to said supporting bracket;
an inner metal tube slidably disposed in said outer metal tube and connected to said press portion of said spoke; and
a plurality of steel balls tightly disposed between said inner and outer metal tubes.

26. A steering wheel construction as claimed in claim 1, 2 or 3, in which said energy absorbing structure comprises two rectangular hollow members of metal which are located at diametrically opposed sides of said hub, each member being welded to both said spoke and said hub.

27. A steering wheel construction as claimed in claim 26, in which said two rectangular hollow members are connected by means of two reinforcing members.

28. A steering wheel construction as claimed in claim 27, in which the interior of each rectangular hollow member is filled with an elastomer.

29. A steering wheel construction as claimed in claim 1, 2 or 3, in which said energy absorbing structure comprises:
a cone-shaped metal member having a smaller diameter portion connected to said hub and a larger diameter portion directed toward said rim;
a pillow like cushion member disposed on the larger diameter portion; and
stress concentrating means for concentrating a marked stress at said smaller diameter portion when said cone-shaped metal member is pressed against said steering shaft.

30. A steering wheel construction as claimed in claim 29, in which said stress concentrating means comprises:
an annular ridge which is formed on said smaller diameter portion and projected toward said steering shaft; and
a guide member tightly disposed about said steering shaft, said guide member having a top portion which is intimately received in a basin portion defined by said annular ridge.

31. A steering wheel construction as claimed in claim 30, in which said top portion of said guide member is formed with a tapered outer surface.

32. A steering wheel construction as claimed in claim 31, in which said smaller diameter portion is bolted to said guide member through an inner washer, said inner washer having a peripheral portion intimately engaged with an inner surface of said cone-shaped metal member.

33. A steering wheel construction as claimed 32, in which said peripheral portion of said inner washer is bent to form a flange.

34. A steering wheel construction as claimed in claim 29, in which said stress concentrating means comprises:
- an annular ridge which is formed on said smaller diameter portion and projected toward said steering shaft; and
- a portion of said hub, said portion having an enlarged head portion which is intimately received in a basin portion defined by said annular ridge.

* * * * *